United States Patent Office 3,752,865
Patented Aug. 14, 1973

3,752,865
ELECTRICAL CABLES INSULATED WITH EXTRACTION RESISTANT STABILIZED POLYMERS
Frank Scardiglia, Woodcliff Lake, and Kornel D. Kiss, Elmsford, N.Y., assignors to Dart Industries Inc., Los Angeles, Calif.
No Drawing. Continuation-in-part of abandoned application Ser. No. 130,818, Apr. 2, 1971. This application July 20, 1971, Ser. No. 164,450
Int. Cl. C08f 45/60; C08g 37/16
U.S. Cl. 260—848
8 Claims

ABSTRACT OF THE DISCLOSURE

Polymeric compositions that contain a phenolic resin containing repeating units having the formula:

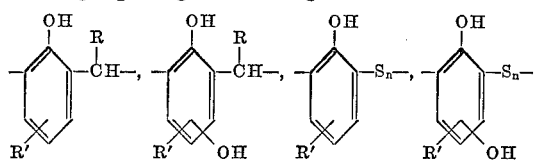

or mixtures thereof wherein R and R' are hydrogen or alkyl, cycloalkyl or aryl radicals having from 1 to 24 carbon atoms, $n$ is 1 or 2 and the average number of repeating units in said polymeric compound is at least 3, and a metal deactivator have unexpectedly high thermal oxidative stability after extraction by viscous liquids. These compositions are particularly useful in the insulation of electrical cables which are utilized in environments likely to cause extraction of stabilizer systems.

CROSS REFERENCE TO RELATED APPLICATIONS

This application is a continuation-in-part of application Ser. No. 130,818, filed Apr. 2, 1971 now abandoned.

FIELD OF THE INVENTION

This invention relates to polymeric compositions of plastic materials having stability against degradation caused by exposure to heat and oxygen after extraction by such nongaseous fluids as organic liquids and aqueous solutions and dispersions. More particularly, it relates to polypropylene compositions containing a synergistic combination of stabilizers which make the compositions ideally suited as insulation for underground electrical cables.

DESCRIPTION OF THE PRIOR ART

Phenolic resins have been widely used as molding compounds and industrial bonding resins. Non-heat reactive, higher alkylphenol resins, e.g., p-alkylphenol-formaldehyde novolac are added to synthetic rubber compounds to increase their tack prior to vulcanization in the manufacture of tires; see U.S. Pat. 3,294,866. Para-tertiaryalkylphenol-formaldehyde A-stage resin has been used as a stabilizer for polypropylene; see U.S. Pat. 2,968,641. The A-stage of a phenol-formaldehyde resin is the early stage in the production of these heat reactive (thermosetting) resins which are soluble in certain liquids and are fusible. Phenol-formaldehyde novolac resins in combination with dilaurylthiodipropionate (DLTDP) or distearylthiodipropionate (DSTDP) have been disclosed in U.S. Pat. 3,328,480 as being useful to stabilize polypropylene. However, such stabilizer systems have not been found to be effective for underground cable applications.

It is well known to stabilize plastics against degradation due to heat and oxidation by incorporating into the polymers a stabilizing amount of certain hindered phenolic antioxidants such as tetra-[methyl 3-(3,5-di-t-butyl-4-hydroxyphenyl) propionate] methane as disclosed in U.S. Pat. 3,285,855. However, such antioxidant stabilizers have not proved entire satisfactory for many end uses. This is true because of the relative ease with which they can be extracted from the polymers by nongaseous fluids. For example, a plurality of indivdual plastic insulated wires are encased in plastic tubing to form underground cables. The void spaces within the tubing are filled with a very high viscosity liquid such as petrolatum or petroleum jelly. A serious disadvantage to the use of plastic materials as insulators for this application has been the fact that the stabilizing amount of the antioxidants incorporated into the plastic insulation is extracted into the petrolatum. This causes a rapid deterioration of the insulation due to the combined effects of heat and oxidation.

Prior art attempts to solve the extraction problem have led to a combination of particular hindered phenolic antioxidants which are not polymeric with certain poly cyclohexylenedisulfides); see U.S. Pat. 3,392,141. However, the use of such a complex combination of compounds does not provide as efficient and economical solution to the problem as does the use of the readily available polymeric resins in combination with the readily available metal deactivators of this invention, which combination has been found not only to give antioxidant protection but to eliminate the extractability problem as well.

Another serious disadvantage to the use of plastic materials, e.g., polypropylene, as insulation for wire and cables is the fact that the degradation of the polymer is accelerated by the presence of copper and alloys of copper. Prior art methods to solve this problem have resulted in a combination of polypropylene with a known antioxidant such as 4,4'-thiobis(3-methyl-6-tertiary butylphenol) and a copper deactivator such as oxalyl dihydrazide; see U.S. Pat. 3,484,285. However, these methods do not solve the problem when the resulting polymeric materials are contacted with petrolatum. In fact results with similar combinations have indicated that the deactivation due to copper is accelerated even further after the polymeric material has been subjected to extraction with petrolatum.

SUMMARY OF THE INVENTION

In contrast to the prior art compositions, the present invention is directed to those compositions that have both thermal oxidative stability in the presence of copper and alloys of copper and resistance to extraction.

The composition of this invention comprises a plastic material having incorporated therein a stabilizing amount of a polymeric compound containing repeating units having the formula:

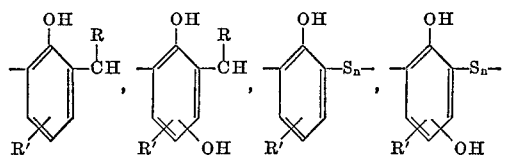

or mixtures thereof, wherein R and R' are hydrogen or an alkyl, cycloalkyl or aryl radicals from 1 to 24 carbon atoms, $n$ is 1 or 2 and the average number of repeating units in said polymeric compound is at least 3 and 0.01 to 5 percent by weight of a metal deactivator based on the weight of the composition. The stabilizing amount of the polymeric compound ranges from 0.01 to about 10 percent by weight of the composition.

The polymeric compounds of this invention comprise the condensation product between phenols such as phenol, catechol, resorcinol, hydroquinone and the alkyl-substituted phenols, including cresols, xylenols, t-butylphenols, t,t,-octylphenols, amylphenols, laurylphenols and mixtures of such phenols, with aldehydes such as formaldehyde, acetaldehyde, propionaldehyde, butyraldehyde, benzaldehyde, tolualdehydes, furfuraldehyde and other suitable reactive compounds, e.g., acetylene, sulfur monochloride and sulfur dichloride. The condensation reaction takes place under conditions well known in the art. The resulting phenolic resins may contain groups which are not reactive under conditions used in their preparation or used to fabricate the finished articles of manufacture from the compositions of this invention. Such groups include oxygen and sulfur bridges and organically bonded halides.

Suitable polymeric compounds which are incorporated into the thermoplastic compositions of this invention include the heat reactive phenolic resins and the non-heat reactive or Novolac phenolic resins.

The following structures are broadly representative of the metal deactivators or chelating agents which are suitable for incorporation into the compositions of this invention:

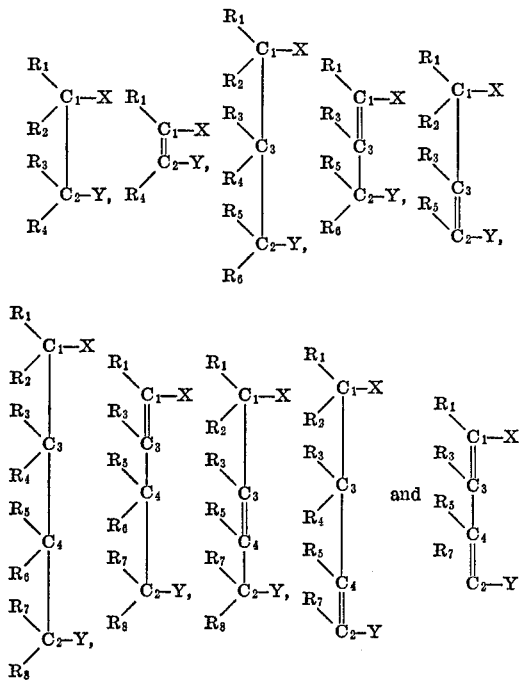

wherein $R_1$, $R_2$, $R_3$, $R_4$, $R_5$, $R_6$, $R_7$ and $R_8$ are selected from the groups consisting of hydrogen, alkyl, cycloalkyl, substituted alkyl and substituted cycloalkyl having 1 to 20 carbon atoms and aryl and substituted aryl and X and Y are each selected from the group or substituted group consisting of the following:

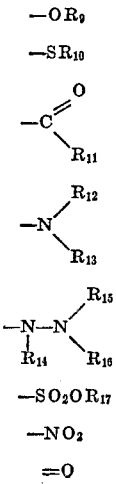

wherein $R_9$ and $R_{10}$ can each be hydrogen, alkyl or cycloalkyl having 1 to 20 carbon atoms, aryl or acyl; $R_{11}$ can be hydrogen, hydroxyl, alkyl or cycloalkyl having 1 to 20 carbon atoms, aryl, alkoxyl, aryloxy, amino or hydrazido; $R_{12}$ and $R_{13}$ can each be hydrogen, alkyl or cycloalkyl having 1 to 20 carbon atoms or aryl, or $R_{12}$ or $R_{13}$ but not both can be amino; $R_{14}$, $R_{15}$ and $R_{16}$ can each be hydrogen, alkyl or cycloalkyl having 1 to 20 carbon atoms, or aryl; and $R_{17}$ can be hydrogen, alkyl or cycloalkyl having 1 to 20 carbon atoms or aryl. $R_{16}$ need not be present and a double bond can exist between N and a carbon atom of $R_{15}$.

In the above structures, the two R groups for $R_1$–$R_8$ that are attached to the same carbon atom can be represented by an oxyl group. $C_1$, $C_2$, $C_3$ and $C_4$ can be part of the same or separate cyclic or conjugated cyclic group. X and Y can be part of the same heterocyclic or conjugated heterocyclic group. $C_1$ and X and $C_2$ and Y can also be part of the same heterocyclic or conjugated heterocyclic group. It is understood that one or more of the $R_1$–$R_8$ groups may be omitted from the above structures consistent with the tetravalent nature of carbon.

Examples of chelating agents that are encompassed within the above structures are listed in Appendix 3 of "Organic Sequestering Agents" by S. Charberek and A. E. Martell, copyright 1959 by John Wiley & Sons, Inc. The following compounds included in this list may be suitable as metal deactivators for the composition of this invention: glycolic acid, lactic acid, gluconic acid, tartaric acid, citric acid, salicylic acid, 5-sulfosalicylic acid, disodium 1,2-dihydroxybenzene-3,5-disulfonate, 8-hydroxyquinoline-5-sulfonic acid, nitroacetic acid, pyrophosphoric acid, meso-2,3-diaminobutane, racemic 2,3-diaminobutane, 2,3-dimethyl-2,3-diaminobutane, meso-1,2-diphenylethylenediamine, racemic 1,2 - diphenylethylenediamine, 2,2-dimethyl-1,3-diaminopropane, 2-hydroxy-1,3-diaminopropane, cis-1,2-diaminocyclohexane, trans-1,3-diaminocyclohexane, histamine, 2 - aminomethylpyridine, 2-(2-aminoethyl)-pyridine, N-hydroxyethyl-2-aminomethylpyridine, pyridoxamine, 1,2,3-triaminopropane, diethylenetriamine, N-amino ethyl-2-(2-aminoethyl)-pyridine, triethylenetetramine, ethylenebis-α,α'-(2-aminomethyl)-pyridine, β,β',β''-triaminotriethylamine, N,N'-diglycylethylenediamine, tetrakis(2 - aminoethyl) - ethylenediamine, methylthioethylamine, 2-amino-2'-hydroxydiethyl sulfide, bis-(2-aminoethyl)-sulfide, 1,2 - di-(2-aminoethylthio)ethane, glycine, N-methylglycine, N-ethylglycine, N-propylglycine, N-butylglycine, N-isopropylglycine, N,N-dimethylglycine, N,N-diethylglycine, N,N-dihydroxyethylglycine, 2-aminoethylpyridine-N-monoacetic acid, β-alanine, valine, norvaline, leucine, norleucine, phenylalanine, tyrosine, serine, threonine, l-ornithine, asparagine, lysine, arginine, proline, tryptophan, cysteine, methionine, histidine, aspartic acid, glutamic acid, glycylglycine, glycylglycylglycine, iminodiacetic acid, N-methyliminodiacetic acid, anilinediacetic acid, N-acetamidoiminodiacetic acid, β-(N-trimethylammonium)ethyliminodiacetic acid, N-cyanomethyliminodiacetic acid, N - methoxyethyliminodiacetic acid, N-hydroxyethyliminodiacetic acid, N-3-hydroxypropyliminodiacetic acid, N-carbethoxy - β - aminoethyliminodiacetic acid, N-methylthioethyliminodiacetic acid, iminopropionicacetic acid, iminodpropionic acid, N-2-hydroxyethyliminodipropionic acid, nitrilotriacetic acid, nitrilopropionicdiacetic acid, nitrilodipropionicacetic acid, nitrilotripropionic acid, N,N'-ethylenebis[2-(o-hydroxyphenyl)] glycine, ethylenebis-N,-N'-(2-aminomethyl)-pyridine-N,N'-diacetic acid, ethylenediamine-N,N'-dipropionic acid, 1,2-diaminocyclohexane-N,N'-tetraacetic acid, ethylenediamine - N,N' - dipropionic-N,N'-diacetic acid, ethylenediamine-N,N'-tetraproponic acid, 2-aminomethylpyridine-N-monoacetic acid, ethylenediamine-tetra(methylenephosphonic) acid and diethylenetriaminepentaacetic acid.

Other examples of metal deactivators that fall within the above structures and are believed to be suitable for the compositions of this invention are azimidobenzene, oxamide and derivatives thereof, the organic acid hydrazides, and the substituted thiodiacyl hydrazides as disclosed in U.S. Pats. 3,367,907, 3,462,517 and U.S. Defensive Publication 728,901, respectively.

The use of a metal deactivator by itself results in little if any stability in the presence of copper for the base polymer. The addition of the phenolic resins of this invention to the base polymer results in some stabilizing effect in the presence of copper over the base resin. However, it has been found that a combination of certain chelating agents with the phenolic resins of this invention results in a stabilizing effect on the composition in the presence of copper that is significantly greater than the sum of the effects of the individual components making up the polymeric composition as will be shown in the examples below. Based on this fact, it is believed that this synergistic effect, which is evident both before and after extraction with petrolatum, is the result of some interaction between the phenolic resin and certain chelating agents in the polymer matrix during the compounding steps. Although not wishing to limit the present invention to any particular theory, it is believed that this synergistic interaction is responsible for a high degree of retention of stability after extraction. One possible explanation of this high degree of stability retention is that certain of the chelating agents are in strong interaction with the relatively high molecular weight phenolic resin which by virtue of its high molecular weight resists extraction by nongaseous fluids.

The synergistic combination between the metal deactivating agents and the phenolic resins of this invention imparts thermal oxidative stability and resistance to extraction by aqueous solutions and dispersions and a wide variety of other liquids, e.g., organic and high viscosity liquids such as petrolatum, waxes, low molecular weight hydrocarbon polymers and the like, to numerous plastic materials when they are used in the presence of copper. These plastic materials include polyethylene, polypropylene, polybutene-1, polystyrene and other substantially hydrocarbon polymers. This group of polymers which are generally regarded as polyolefin resins also includes materials having a hydrocarbon backbone with various substituent groups on the hydrocarbon chain such as polyvinylchloride, polyvinylidene chloride, polyvinyl acetate, polyvinyl alcohol, polyacrylic acid, poymethacrylic acid, polyacrylates (methyl, ethyl, butyl, octyl, etc.), polymethacrylates (methyl, ethyl, butyl, octyl, etc.), polyacrylonitrile, polymers of maleic, fumaric and itaconic acid and their esters (methyl, ethyl, butyl, octyl, etc.).

PREFERRED EMBODIMENTS OF THIS INVENTION

The plastic materials that are of particular interest in the polymeric compositions of this invention comprise solid, substantially crystalline polyolefins including homopolymers and copolymers of ethylene and alpha-monoolefins having from 3 to 6 carbon atoms. Examples of such polyolefins are polyethylene, polypropylene, polybutene-1, polypentene-1, poly(3-methyl butene-1), poly(4-methyl pentene-1) and ethylene/propylene copolymers.

The preferred phenolic resin component of the composition of the present invention is a non-heat reactive, polymeric compound containing an average of at least 3 and preferably containing at least 5 and as high as 100 of the following repeating units:

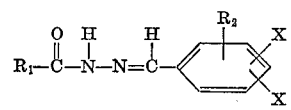

R is preferably either hydrogen or an alkyl radical having from 1 to 8 carbon atoms and R' is preferably an alkyl radical having from 4 to 18 carbon atoms with at least one being a tertiary carbon atom or an aryl radical having up to 18 carbon atoms. Especially preferred phenolic resins include t-butyl phenolacetaldehyde novolac, t-butyl phenol-acetylene novolac, t,t-octyl phenol-acetaldehyde novolac, t,t-octyl phenol-butyraldehyde novolac and mixture of these resins.

Preferably the phenolic resin is incorporated into the polyolefin in amounts of about 0.1 to 5 weight percent. In addition to the phenolic resin and the metal deactivator, known synergists such as DSTDP and/or DLTDP or a polymer moiety containing a thioester grouping can be incorporated into the polymeric composition usually in amounts not exceeding 1.5 percent, preferably in the range of about 0.5 to 1.3 percent based on the total weight of the composition. In addition the polymeric compositions of this invention can also contain other optional ingredients such as ultraviolet stabilizers, pigments, delustrants, plasticizers, flame retardant materials, anti-static agents, processing aids such as calcium stearate and any other additive which is known in the art to impart a particular property to the composition for a particular application.

The preferred metal deactivators of the composition of this invention are the acid hydrazides of the general formula:

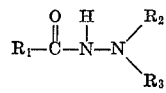

wherein $R_1$ is an alkyl, cycloalkyl, substituted alkyl or substituted cycloalkyl group having 1 to 20 carbon atoms, an aryl or substituted aryl group or a heterocyclic or conjugated heterocyclic group. The heterocyclic group is either a five or six membered ring and at least one of the members is sulfur, oxygen or nitrogen. $R_2$ and $R_3$ can each be H, or can each be the same as $R_1$.

More preferred metal deactivating agents are the acid hydrazides which have the general formula:

$$R_1-\overset{O}{\underset{}{C}}-\overset{H}{\underset{}{N}}-\overset{H}{\underset{}{N}}=\overset{R_2}{\underset{}{C}}-\underset{X}{\overset{X}{\bigcirc}}$$

wherein $R_1$ is the same as the $R_1$ in the formula in the preceding paragraph, $R_2$ is hydrogen, hydroxyl or an alkyl (1–20 carbon atoms, preferably lower alkyl having 1–4 carbon atoms) or alkoxyl (1–20 carbon atoms, preferably lower alkoxyl having 1–4 carbon atoms) and X is hydrogen or halogens (F, Cl, Br and I).

The N-benzal-(oxalyl dihydrazides), N,N'-dibenzal-(oxalyl dihydrazides) and derivatives thereof as disclosed in U.S. Pat. 3,440,210 and N-salicylidene-N'-salicyl-hydrazide are especially useful in promoting a pronounced synergistic effect with the novolac resins in crystalline polypropylene compositions as indicated in the examples below.

The following examples are given to illustrate the preferred embodiments of this invention and are not intended to limit its scope. All percentages of the constituents making up the polymeric compositions are based on the weight of the polypropylene copolymer.

Examples 1–9

A polypropylene copolymer containing about 12 weight percent ethylene, having a density of about 0.9, a melt index at 230° C. of about 3 gms./10 min. and containing at least about 96 percent heptane insolubles was blended with the amount of constituents indicated in Table I below for both the controls and the examples in a Waring Blendor until a homogeneous composition was obtained. Each of the blended samples was then compression molded into 6" x 6" x 10 mil. plaques at 400° F. and 25,000 p.s.i.g. for 60 seconds. Plaques of the controls and examples were rapidly cooled at high pressure and cut into 1½" x 1½" x 10 mil. strips. One set of strips was submerged in U.S.P. grade petrolatum at 86°±1° C. for 18 hours. The strips were removed from the petrolatum, wiped clean and tested using differential thermal analysis (DTA). This analysis provides an extremely effective method for obtaining accelerated aging data which can be extrapolated to periods of decades at ambient temperatures.

The controls and examples were all tested by the following DTA procedure:

A small sample of the 10 mil. film strip prepared in the compression mold having a diameter of approximately 0.25" is placed on a copper test pan in a Perkin-Elmer differential scanning calorimeter (DSC). The pan is then covered and heated from room temperature at a linear programmed rate of 10° C./min. in the presence of nitrogen flowing through the DSC at a rate of 0.08 cu. ft. per hour. When the temperature in the DSC reaches 200° C., the nitrogen is automatically stopped and oxygen flowing at the same rate is passed through the DSC. The temperature is maintained at 200° C. until the oxidation peak has occurred and the induction period is measured in minutes from the time the oxygen is added until the oxidative degradation occurs.

TABLE I.—PRIMARY STABILIZERS USED IN CONTROLS AND EXAMPLES 1–9

| | |
|---|---|
| Controls A & B | Tetra-[methylene-(3,5-di-t-butyl-4-hydroxyphenyl)propionate] methane. |
| Example 1 | t-Butyl phenol-acetylene novolac. |
| Example 2 | Resorcinol-isobutyraldehyde novolac. |
| Example 3 | t-Butyl phenol-formaldehyde novolac. |
| Example 4 | t-Butyl phenol-acetaldehyde novolac. |
| Example 5 | Mixture of t-butyl and t,t-octyl phenols-acetaldehyde novolac.[1] |
| Example 6 | t-Amyl phenol-formaldehyde novolac. |
| Example 7 | Mixture of t-butyl and t-amyl phenols-formaldehyde novolac.[1] |
| Example 8 | Lauryl phenol-formaldehyde novolac. |
| Example 9 | t,t-Octyl phenol-formaldehyde heat reactive resin. |

[1] A commercially available novolac resin made from a mixture of phenols as indicated in which the relative proportion of each is unknown.

Table II below indicates the induction time in minutes for the controls and examples both before and after extraction with the petrolatum.

TABLE II.—DTA DATA

| | Percent of— | | DTA, minutes at— | | Percent retention of stability |
|---|---|---|---|---|---|
| | Primary stabilizer | Secondary stabilizer[1] | Before extraction | After extraction | |
| Control: | | | | | |
| A | 1 | | 100 | 7 | 7 |
| B | 1 | 1 | 109 | 9 | 8 |
| Example: | | | | | |
| 1 | 2 | 1 | 84 | 65 | 78 |
| 2 | 2 | 1 | 7 | 7 | 100 |
| 3 | 2 | 1 | 46 | 44 | 96 |
| 4 | 2 | 1 | 87 | 69 | 79 |
| 5 | 2 | 1 | 94 | 73 | 78 |
| 6 | 2 | 1 | 42 | 40 | 95 |
| 7 | 2 | 1 | 49 | 47 | 96 |
| 8 | 2 | 1 | 73 | 51 | 70 |
| 9 | 2 | 1 | 12 | 9 | 75 |

[1] N-salicylidene-N'-salicyl hydrazide.

Table II illustrates that the compositions of this invention all have much greater retention of stability than the control compositions after they have been subjected to extraction with a fluid such as petrolatum and then to the DTA procedure. It is of interest to note the comparison between the DTA data obtained on the compositions of Examples 3 and 6 and that obtained on the composition of Example 7, which is a novolac resin made from a mixture of the phenols used in the compositions of Examples 3 and 6. There is a slight improvement in the stability data obtained on the mixture of resins over that of each resin taken along and essentially no difference in the percent retention of stability data.

Plaques of the controls and examples were cut into ½" x 2" x 10 mil. strips. Five strips of each of the controls and examples were placed on Pyrex glass plates and put into a Model 625A Freas forced draft oven at 150°. Five strips of each of the conrtols and examples were treated with petrolatum as described above in the first paragraph of Examples 1–9 and were then subjected to the same conditions in the forced draft oven. The strips were checked periodically during the first day and were checked daily thereafter for signs of failure. The time to failure for each of the five strips was averaged to obtain the oven life results for each of the controls and examples as set forth in Table III below:

TABLE III.—LTHA IN FORCED DRAFT OVEN

| | Hours to failure at— | | Percent retention of stability |
|---|---|---|---|
| | Before extraction | After extraction | |
| Control: | | | |
| A | 334 | 132 | 40 |
| B | 1,470 | 164 | 11.2 |
| Example: | | | |
| 1 | 836 | 639 | 77 |
| 2 | 44 | 25 | 57 |
| 3 | 165 | 122 | 73 |
| 4 | 1,025 | 977 | 95.5 |
| 5 | 1,164 | 1,053 | 90.5 |
| 6 | 141 | 137 | 97 |
| 7 | 127 | 123 | 97 |
| 8 | 348 | 202 | 58 |
| 9 | 274 | 42 | 15 |

The composition of Example 5, which is a particularly outstanding composition in comparison to many of the other compositions of this invention based on the DTA and LTHA data, was tested using ASTM D-150-64T and found to have the electrical properties set forth in Table IV below:

TABLE IV.—ELECTRICAL PROPERTIES

| | Polypropylene copolymer[1] | Composition of Example 5 |
|---|---|---|
| Dielectric constant at— | | |
| 100 cps | 2.32 | 2.32 |
| 1,000 cps | 2.31 | 2.31 |
| 1,000,000 cps | 2.29 | 2.29 |
| Dissipation factor at— | | |
| 100 cps | 0.0006 | 0.0006 |
| 1,000 cps | 0.0002 | 0.0002 |
| 1,000,000 cps | 0.0002 | 0.0002 |

[1] Used as base resin for the composition of Example 5.

The fact that the composition of this invention had exactly the same dielectric constant and dissipation factor as the base resin is an especially important factor in wire and cable applications. It is especially significant that the composition of Example 5 contained as much as 2 weight percent of the primary stabilizer and 1 weight percent of the secondary stabilizer without affecting its electrical properties.

Examples 10–16

Examples 10–16 illustrate the effect changes in the amount of the primary and secondary stabilizers have on the DTA data. The data set forth in Table V below was obtained using exactly the same procedures used to obtain the data of Table II.

TABLE V

| | Percent | | DTA | | Percent retention of stability |
|---|---|---|---|---|---|
| | Primary stabilizer [1] | Secondary stabilizer [2] | Minutes before extraction | Minutes after extraction | |
| Control: C | 2.0 | 0 | 26 | 22 | 85 |
| Example: | | | | | |
| 10 | 1.0 | 0.25 | 38 | 19 | 50 |
| 11 | 1.5 | 0.25 | 66 | 41 | 62 |
| 12 | 2.0 | 0.25 | 107 | 61 | 57 |
| 13 | 1.5 | 0.5 | 88 | 66 | 75 |
| 14 | 2.0 | 0.5 | 120 | 93 | 78 |
| 15 | 1.0 | 1.0 | 93 | 84 | 89 |
| 16 | 1.5 | 1.0 | 86 | 81 | 94 |
| 5 [3] | 2.0 | 1.0 | 94 | 73 | 78 |

[1] The same mixture of t-butyl and t,t-octyl phenolacetaldehyde novolac used as the primary stabilizer in Example 5.
[2] N-salicylidene-N'-salicyl hydrazide.
[3] Included in Table V as a convenient comparison.

Examples 17–19

Examples 17–19 when compared to Controls C–K, illustrate the synergistic effect that it obtained for the compositions of this invention. A comparison of Examples 17–19 with Control K indicates that EDTA, a well-known chelating agent, has no metal deactivation effect when combined with the primary stabilizer in the same amounts as the secondary stabilizer of this invention. These examples also indicate that while the compositions of this invention are particularly useful in applications where copper is present, the compositions are effective in the presence of other known conductors such as aluminum.

The data set forth in Table VI below was obtained using the same procedures that were used to obtain the data of Table II except as otherwise noted in Table VI.

TABLE VI.—DTA DATA SHOWING SYNERGISTIC EFFECT OF COMPOSITION OF THIS INVENTION

| | Percent | | | | DTA | | Percent retention of stability |
|---|---|---|---|---|---|---|---|
| | Primary stabilizer [1] | Secondary stabilizer | Irganox 1010 [2] | Ionol | Minutes before extraction | Minutes after extraction | |
| Control: | | | | | | | |
| C | 2 | 0 | 0 | 0 | 26 | 22 | 85 |
| D | 0 | 0 | 2 | 0 | 335 | 39 | 11.6 |
| E | 0 | 0 | 2 | 0 | [7] N.A. | [5] 51 | [7] N.A. |
| F | 0 | [3] 1 | 2 | 0 | >400 | [6] 26 | <6 |
| G | 0 | [3] 1 | 2 | 0 | [7] N.A. | [5] 15 | [7] N.A. |
| H | 2 | 0 | 0 | 0.1 | 76 | 18 | 23.7 |
| I | 0 | [3] 1 | 0 | 0 | 3 | 1 | 33.3 |
| J | 0 | [4] 1 | 0 | 0 | <1 | <1 | ~0 |
| K | 2 | [4] 1 | 0 | 0 | 36 | 6 | 16.7 |
| Example: | | | | | | | |
| 17 | 2 | [3] 1 | 0 | 0.1 | 140 | 124 | 88.6 |
| 18 | 2 | [3] 1 | 0 | 0 | 135 | [6] 122 | 92.0 |
| 19 | 2 | [3] 1 | 0 | 0.1 | 154 | [5] 108 | 40.2 |

[1] The same mixture of t-butyl and t,t-octyl phenols-acetaldehyde novolac used as the primary stabilizer in Example 5.
[2] Tetra-[methylene-(3,5-di-t-butyl-4-hydroxyphenyl) propionate] methane.
[3] N-salicylidene-N'-salicyl-hydrazide.
[4] EDTA (ethylenediaminetetraacetic acid).
[5] Sample was placed on an aluminum test pan instead of a copper test pan.
[6] Average of 2 data points
[7] Not available.

Examples 20–29

Examples 20–29 when compared with Controls L and M, demonstate that the synergistic effect noted in the above examples is also evident from the DDTA data obtained on incorporating into the polypropylene copolymer a combination of the primary stabilizer with other similar secondary stabilizers that fall under the general category of acid hydrazides as discussed above under Preferred Embodiments of This Invention. These examples also illustrate the same criticality exists with respect to the amount of these other secondary stabilizers that are incorporated into the copolymer that was found to exist in Examples 10–16. In general, it can be seen from these examples that increasing the amount of the primary and/or secondary stabilizers yields greater thermal oxidative stability after extraction. Additions of greater than 5% of the secondary stabilizer may adversely affect other properties of the polymeric composition, e.g., dielectic properties. Therefore, the preferred range for the secondary stabilizer is 0.1 to 5% by weight of the composition.

The data of Table VII below was obtained using the same procedure used to obtain the data of Table II.

TABLE VII.—DTA DATA SHOWING SYNERGISTIC EFFECT WITH VARIOUS SECONDARY STABILIZERS

| | Percent | | | DTA | | |
|---|---|---|---|---|---|---|
| | Primary stabilizer [1] | Secondary stabilizer | Ionol | Minutes before extraction | Minutes after extraction | Percent retention of stability |
| Control: | | | | | | |
| L | 0 | [2] 1 | 0 | [6] N.A. | <1 | [6] N.A. |
| M | 0 | [3] 1 | 0 | [6] N.A. | <1 | [6] N.A. |
| Example: | | | | | | |
| 20 | 2 | [2] 1 | 0.1 | 111 | 78 | 70.2 |
| 21 | 2 | [2] 0.5 | 0.1 | [6] N.A. | 62 | [6] N.A. |
| 22 | 1 | [2] 0.5 | 0.1 | [6] N.A. | 35 | [6] N.A. |
| 23 | 2 | [3] 1 | 0.1 | 116 | 88 | 75.9 |
| 24 | 2 | [3] 0.5 | 0.1 | [6] N.A. | 85 | [6] N.A. |
| 25 | 1 | [3] 0.5 | 0.1 | [6] N.A. | 25 | [6] N.A. |
| 26 | 2 | [3] 1 | 0 | 70 | 87 | ~100 |
| 27 | 2 | [3] 0.5 | 0 | [6] N.A. | 85 | [6] N.A. |
| 18 [4] | 2 | [5] 1 | 0.1 | 140 | 124 | 88.6 |
| 28 | 2 | [5] 0.5 | 0.1 | [6] N.A. | 93 | [5] N.A. |
| 29 | 1 | [5] 0.5 | 0.1 | [6] N.A. | 78 | [6] N.A. |

[1] See note 1 on Table VI.
[2] N,N'-dibenzal-(oxalyl dihydrazide).
[3] N,N'''diacetyl-N,'N,'' adipoyl dihydrazide.
[4] Included in Table VII as a convenient comparison.
[5] N-salicylidene-N'-salicyl-hydrazide.
[6] Not available.

Examples 30–33

Examples 30–33 illustrate the effect the type of the primary stabilizer has on the DTA results. In all cases the percent retention of stability remains high for the compositions of this invention.

The data set forth in Table VIII below was obtained using the same procedure used to obtain the data of Table II.

TABLE VIII.—DTA DATA OBTAINED WITH VARIOUS STABILIZERS

| Example | Percent Primary stabilizer | Percent Secondary stabilizer | DTA Minutes before extraction | DTA Minutes after extraction | Percent retention of stability |
|---|---|---|---|---|---|
| 30 | [1] 2 | [5] 1 | [6] 94.5 | [6] 95 | ~100 |
| 31 | [2] 2 | [5] 1 | 18 | 15 | 83.3 |
| 32 | [3] 2 | [5] 1 | 63 | 54 | 85.6 |
| 33 | [4] 2 | [5] 1 | [7] N.A. | 40 | [7] N.A. |

[1] t,t-Octyl phenol-acetaldehyde novolac.
[2] Dipentene phenol-formaldehyde novolac.
[3] t,t-Octyl phenol-butyraldehyde novolac.
[4] An alkyl phenol sulfide resin sold under the trademark Vultac #3 by Pennsalt Corporation and having the general formula:

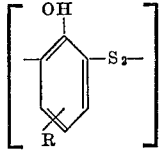

wherein R is an alkyl and $n$ is greater than 3.
[5] N-salicylidene-N-salicyl-hydrazide.
[6] An average of two data points.
[7] Not available.

The foregoing examples illustrate that the novel polymeric compositions of the present invention have excellent thermal oxidative stability and electrical properties. In contrast to the control compositions, the compositions of this invention have greater retention of thermal oxidative stability after they have been subjected to extraction with a fluid such as petrolatum.

The compositions of the present invention are particularly useful as solid insulation in direct contact with copper conductors in underground cable applications where the insulation is in contact with petrolatum as described above in Description of the Prior Art. The specifications for the compositions for these applications are very stringent. In addition to having excellent electrical properties, the compositions after extraction with petrolatum must have an induction period of at least 50 minutes at 200° when tested using DTA with copper pans as described in Examples 1–9 or must retain at least 75% of the thermal oxidative stability they have before extraction. The foregoing data indicates that numerous examples of compositions within the scope of the presently claimed invention meet the stringent specifications for underground cable applications.

It is obvious to those skilled in the art that many variations and modifications can be made to the compositions of this invention. All such departures from the foregoing specification are considered within the scope of this invention as defined by this specification and the appended claims.

What is claimed is:

1. A polymeric composition having thermal oxidative stability and resistance to extraction comprising a solid, substantially crystalline polyolefin having incorporated therein 0.01 to about 10 percent by weight of a polymeric compound containing repeating units having the formula:

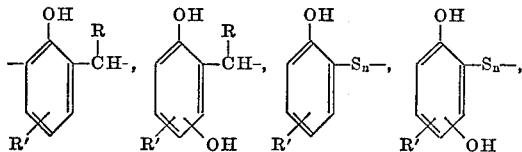

or mixtures thereof, wherein R and R′ are hydrogen or alkyl, cycloalkyl or aryl radicals having from 1 to 24 carbon atoms, $n$ is 1 or 2 and the average number of repeating units in said polymeric compound is at least 3 and 0.1 to about 5 percent by weight of an acid hydrazide having the formula:

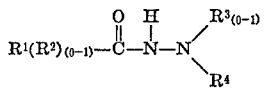

wherein $R^1$ is hydrogen or

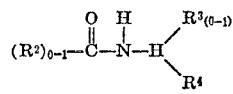

$R^2$ is an alkylene, cycloalkylene, substituted alkylene or substituted cycloalkylene group having 1 to 20 carbon atoms; an arylene or a substituted arylene group, or a heterocyclic or conjugated heterocyclic group, $R^3$ and $R^4$ each can be hydrogen, acyl or H-$R^2$ or $R^4$ is a

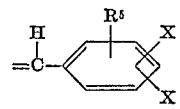

group in the absence of $R^3$, wherein
$R^5$ is hydrogen, hydroxyl, alkyl or alkoxyl and
X is hydrogen, fluorine, chlorine, bromine or iodine.

2. The polymeric composition of claim 1 wherein the acid hydrazine is N-salicylidene-N′-salicyl hydrazide.

3. The polymeric composition of claim 1 wherein the acid hydrazide is N,N′-dibenzal-(oxalyl dihydrazide).

4. The polymeric composition of claim 1 wherein the acid hydrazide is N,N‴-diacetyl-N′,N″-adipoyl dihydrazide.

5. The polymeric composition of claim 1 wherein said polyolefin is polypropylene.

6. The polymeric composition of claim 1 wherein the number of repeating units in said polymeric compound is at least 5.

7. The polymeric composition of claim 1 wherein said polymeric compound is a novolac resin.

8. An electrical element comprising a copper conductor having solid insulation in contact therewith, said insulation comprising the polymeric composition of claim 1.

References Cited

UNITED STATES PATENTS

| | | | |
|---|---|---|---|
| 3,392,141 | 7/1968 | Blumberg | 260—848 |
| 3,328,489 | 6/1967 | Murdock | 260—848 |
| 3,234,176 | 2/1966 | Bata et al. | 260—848 |
| 3,297,478 | 1/1967 | Larsen | 260—848 |
| 3,484,285 | 12/1069 | Hansen | 260—45.9 R |
| 3,367,907 | 2/1968 | Hansen | 260—45.9 R |
| 3,462,517 | 8/1969 | Hansen et al. | 260—45.9 R |
| 2,373,049 | 4/1945 | Pedersen | 260—801 |
| 2,396,156 | 3/1946 | Clarkson | 260—45.9 R |

FOREIGN PATENTS

| | | | |
|---|---|---|---|
| 16,905 | 8/1964 | Japan | 260—848 |

JOHN C. BLEUTGE, Primary Examiner

U.S. Cl. X.R.

117—232; 260—45.9 R, 844, 847, 874, 897 R, 898, 899, 901

UNITED STATES PATENT OFFICE
CERTIFICATE OF CORRECTION

Patent No. 3,752,865　　　　　　　　Dated August 14, 1973

Inventor(s)　Frank Scardiglia et al

It is certified that error appears in the above-identified patent and that said Letters Patent are hereby corrected as shown below:

Column 12, line 12　　　the portion of the formula reading:

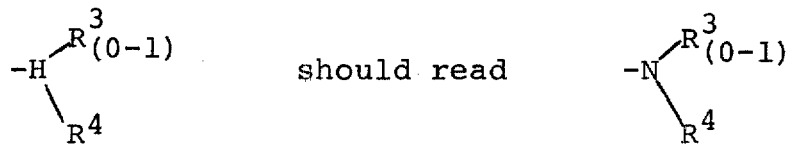

should read

Column 12, line 32　　　"hydrazine" should read --hydrazide--

Signed and sealed this 20th day of November 1973.

(SEAL)
Attest:

EDWARD M. FLETCHER, JR.　　　　　RENE D. TEGTMEYER
Attesting Officer　　　　　　　　　Acting Commissioner of Patents